Nov. 22, 1960 — H. HERTEL — 2,961,197
MISSILE CARRYING AIRCRAFTS
Filed April 3, 1956 — 4 Sheets-Sheet 1
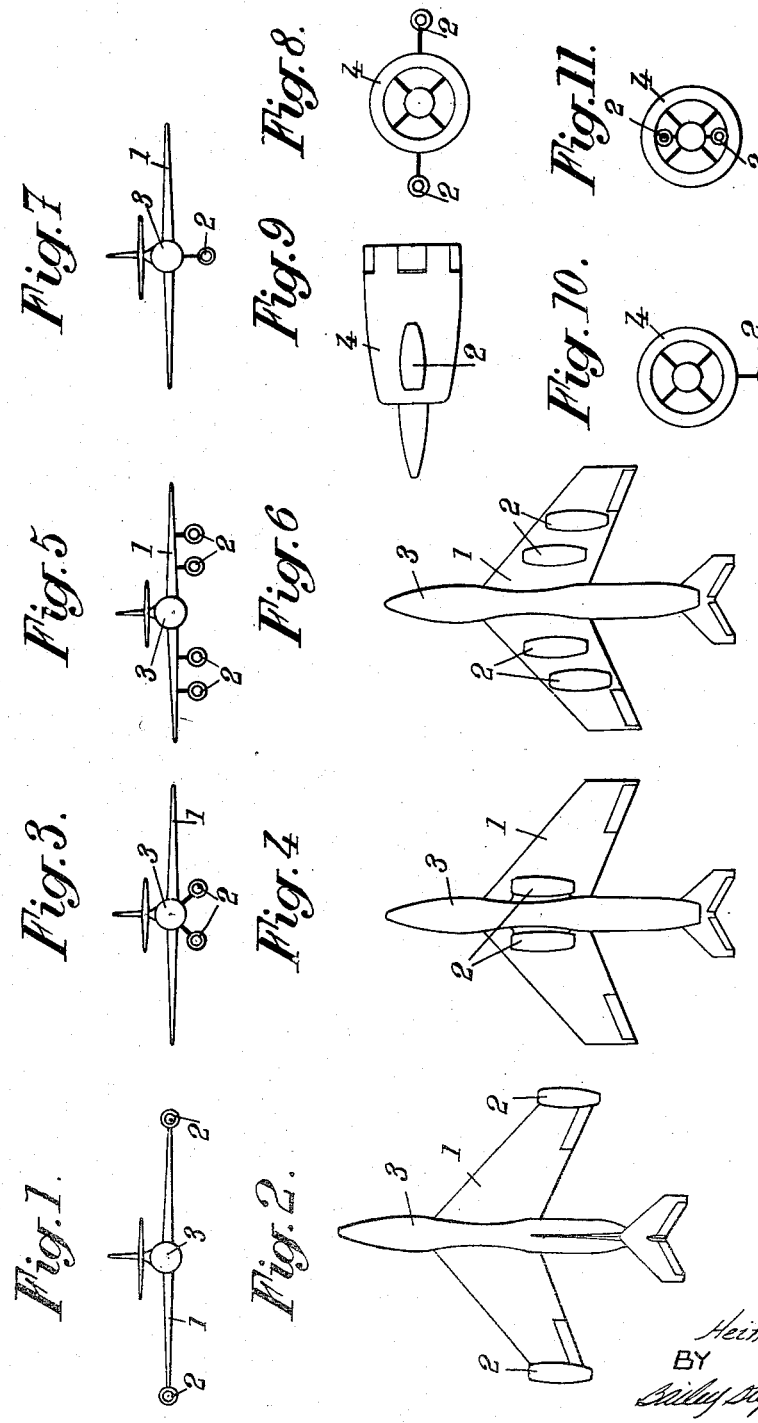
INVENTOR
Heinrich Hertel
BY
ATTORNEYS

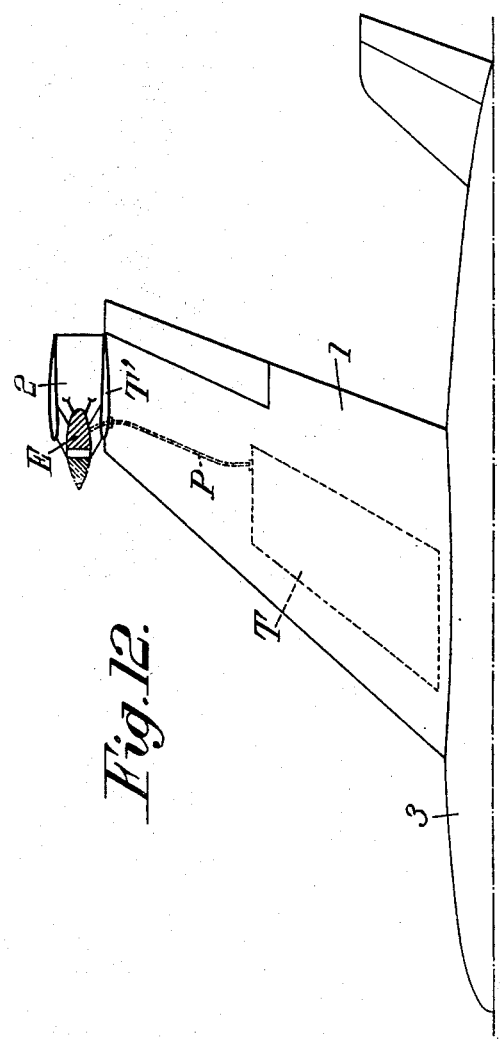

Nov. 22, 1960 H. HERTEL 2,961,197
MISSILE CARRYING AIRCRAFTS
Filed April 3, 1956 4 Sheets-Sheet 3

INVENTOR
Heinrich Hertel
BY
Bailey, Stephens & Huettig
ATTORNEYS

Nov. 22, 1960 — H. HERTEL — 2,961,197
MISSILE CARRYING AIRCRAFTS
Filed April 3, 1956 — 4 Sheets-Sheet 4

INVENTOR
Heinrich Hertel
BY
Bailey Stephens & Huettig
ATTORNEYS

United States Patent Office 2,961,197
Patented Nov. 22, 1960

2,961,197
MISSILE CARRYING AIRCRAFTS

Heinrich Hertel, 28 rue de Bois (Seine and Marne), Fontainebleau, France

Filed Apr. 3, 1956, Ser. No. 575,730

Claims priority, application France Nov. 19, 1953

5 Claims. (Cl. 244—58)

The present invention relates to systems constituted by an aircraft and in particular a fighter airplane and one or several self-propelled missiles (rockets, torpedoes or the like) carried by said aircraft and intended to be launched therefrom toward a target. The invention is more especially, but not exclusively, concerned with systems of this kind in which the propelling means of the missile are constituted by a thermal engine through which a continuous stream of air is flowing, and in particular by a ram-jet engine.

This application is a continuation-in-part of application No. 468,939, filed November 15, 1954, now abandoned.

The object of my invention is to provide a system of this kind which is better adapted to meet the requirements of practice than those used up to the present time, in particular concerning performance and radius of operation and also the conditions in which the missile is launched.

According to my invention, an aircraft of the kind above indicated is provided with means for connecting the source of energy carried by said aircraft for operating the propelling means thereof with the propelling means of the missile, whereby as long as said missile is being carried by said aircraft the missile propelling means can be used to cooperate in the aircraft propulsion without consuming energy from the source carried by said missile, said connecting means being adapted to be cut off when the missile is to be launched.

Other features of my invention will become apparent in the course of the following detailed description of specific embodiments thereof with reference to the appended drawings given merely by way of example and in which:

Figs. 1 and 2 show, respectively in end view and in plan view, the combination of a fighter airplane with two self-propelled missiles according to a first embodiment of my invention.

Figs. 3 and 4 are views similar to Figs. 1 and 2 respectively but relating to another embodiment.

Figs. 5 and 6 are views similar to Figs. 1 and 2 and showing still another embodiment of my invention.

Fig. 7 is an end view of a fighter airplane carrying a single self-propelled missile according to my invention.

Figs. 8 and 9 show, respectively in end view and in side view, an aircraft having a tunnel-shaped annular wing and carrying two self-propelled missiles according to a particular embodiment of my invention.

Figs. 10 and 11 are views similar to Fig. 8 relating to modifications of my invention.

Fig. 12 is a plan view of an aircraft of the type of Figs. 1 and 2, showing in more detailed fashion the arrangement of the missile and of the fuel connections.

Figure 15:
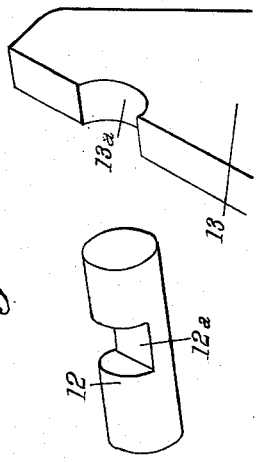
Fig. 15 is an exploded view showing elements of the device for securing a missile to an aircraft according to the embodiment of Figs. 13 and 14.
Figure 16:
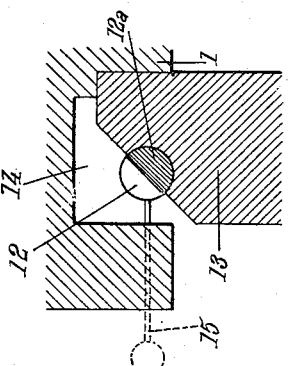
Fig. 16 is a vertical sectional view of a portion of said missile fixation device.
Figure 13:
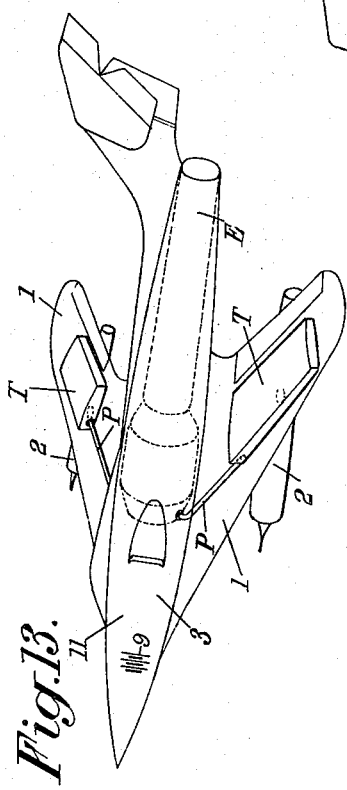
Fig. 13 is a perspective view of an aircraft provided with self-propelled missiles arranged according to still another embodiment of my invention.

It will first be supposed that the aircraft proper is of a conventional type such as shown in plan view by Figs. 2, 6 and 12. It will also be supposed, merely by way of example, that said aircraft is propelled by a thermal engine through which a continuous stream of air is flowing (turbo-jet, turbo-propeller, ram-jet engine).

The missiles 2 to be carried by such aircrafts are preferably constituted in such manner that their propelling means also include a thermal engine through which a continuous stream of air is flowing, said propelling means being advantageously of the ram-jet kind, as it will be supposed hereinafter.

It will be advantageous to constitute said missiles according to the features disclosed in the French Patent No. 1,033,590, which consist in constituting the missile by a flying ram-jet engine, that is to say by constituting the only aerodynamic supporting surface by an annular tunnel-shaped wing the inner wall of which forms the casing or duct of a ram-jet engine.

Such missiles 2 are fixed to the carrier aircraft through detachable fixation means (not shown) which make it possible to launch said missile or missiles toward the desired target.

Now, according to my invention, the propelling means of each missile 2 are connected with a source of energy (in particular a reserve of fuel) carried on board the carrier aircraft and capable of operating the propelling means of said missile in such manner that the source of energy (for instance a reserve of fuel) carried by the missile is not used to operate the propelling means thereof before its launching, said reserve of fuel being kept for use when the missile is travelling by itself.

It is therefore possible, as long as the missile is being carried toward the zone where it is to be launched toward a target, simultaneously to use the propelling means of said aircraft and the propelling means of the missile without impairing in any way the performance of the missile and in particular its radius of operation after it has been launched.

It will be readily understood that the qualities of the system constituted by the carrier aircraft and the missile or missiles mounted thereon will be considerably increased since each of said missiles constitutes, during the flight toward the target zone, not a dead weight which increases the drag of the whole, but an additional propelling system which may be used either only in special circumstances where supplementary power is needed (for instance for taking off, climbing or fighting), or in a permanent way to increase the speed of the aircraft and therefore to reduce the time necessary for reaching the target zone.

The missile or missiles will therefore be disposed in such manner that the resultant thrust they supply is located in the longitudinal plane of symmetry of the aircraft.

For this purpose, I may, in the case of a conventional aircraft (as shown by Figs. 1 to 7 and in Fig. 12), proceed in the following manner.

In the construction illustrated by Figs. 1 and 2, a missile 2 is detachably fixed to each end of the wing 1, each of said missiles therefore occupying a position similar to that sometimes occupied by supplementary fuel tanks.

In the construction of Figs. 3 and 4, two missiles 2 are mounted on either side of fuselage 3 preferably at some distance therefrom.

In the construction of Figs. 5 and 6, the missiles are disposed symmetrically on either side of the plane of symmetry of the aircraft and under the wing 1 thereof.

In the construction of Fig. 7, there is a single missile 2, placed under the fuselage 3 of the aircraft, the axis of said missile being located in the longitudinal plane of symmetry of the aircraft.

In the case of a missile 2 located at some distance from the structure of the carrier aircraft (as shown by Figs. 3 to 7), it will be of interest to mount said missile on a streamlined support the length of which is advantageously of the same order of magnitude as the diameter of the missile. This support may belong either to the aircraft or to the missile.

Whatever be the particular embodiment that is chosen it will be advantageous to use, for feeding the ram-jet engine of each missile during transportation flight, the same fuel as is used to feed the propelling system of the carrier aircraft. For this purpose it suffices to provide on said aircraft a single fuel reserve which serves both to feed the propelling means of the aircraft and the propelling means of the missile or missiles mounted on the aircraft.

Such an arrangement is illustrated by Fig. 12 where the aircraft carries a fuel tank T located for instance in the wing 1 of said aircraft, this fuel tank being connected though the pipe P with the engine E of a missile 2 mounted at the end of said wing. In the arrangement illustrated by Fig. 12, the missile is supposed to have a tunnel-shaped annular wing and the fuel tank T' of said missile is provided inside said wing.

It should be noted that it will be advantageous to provide means for adjusting the thrust of each missile when it is operated during transportation flight. Such means may advantageously be constituted in such manner as to permit at least two different flying conditions, for instance corresponding respectively to different thrusts.

Some numerical examples will now be given merely by way of information to explain the advantages which can be obtained with the invention.

It has been calculated that, for a fighter airplane of a span of ten meters, it is particularly advantageous to make use of missiles 2 propelled by ram-jet engines having a diameter averaging 0.5 meter.

With such missiles mounted on an airplane propelled by a turbo-jet engine giving a thrust of 4,000 kgs. and which may have at an altitude of 15,000 m. a speed corresponding to a Mach number equal to 1.3, there is obtained when both said turbo-jet engine and the ram-jet engine of each missile are used, with a single missile, a speed corresponding to a Mach number equal to 1.5, and with two missiles carried by the aircraft, a speed corresponding to a Mach number equal to 1.75.

It should be noted that these improved performances must be compared not with the performances of the aircraft considered separately (Mach number equal to 1.3), but to the lower performances which would be obtained with such an aircraft if it were carrying the missiles without making use of their thrusts.

Thus, while at the present time it is very difficult to make a fighter flying at a speed higher than sound velocity, the fact of providing such an aircraft with missiles according to my invention, instead of constituting a handicap, would make it possible easily to obtain a horizontal flying speed much higher than sound velocity.

Up to now it has been supposed that the carrier aircraft is of the conventional type but my invention could as well be applied to aircrafts to a construction as described in French Patent No. 1,050,948. According to such a construction, the only supporting aerodynamic surface of the aircraft is constituted by a tunnel-shaped annular wing 4 (Figs. 8 to 10) in which is provided a propelling system the axis of which coincides with the axis of said wing, the control surfaces of the aircraft being distributed symmetrically about this common axis.

In such a case I may, as shown by Figs. 8 and 9, dispose the missiles 2 on either side of said annular wing 4, for instance in diametrically opposed positions.

I might also, as shown by Fig. 10, provide a single missile 2 at some distance from wing 4.

I might also, as shown by Fig. 11, mount at least one missile 2 inside wing 4.

Figs. 13 to 19 illustrate a specific example of a combination according to my invention.

The missile 2 is fixed to the wing 1 in a detachable manner by the following device.

The wing 1 of the aircraft is provided with two housings 14, for instance of rectangular horizontal section, located at a suitable distance, one behind the other. Across each of these housings extends a locking pin 12 transverse to the fore-and-aft direction of the aircraft and journalled in the wing.

The portion of each of said pins 12 located in the corresponding housing 14 is cut so as to be of semicircular cross section, as shown at 12a.

Two vertical arms 13, also of rectangular horizontal section, are rigid with the missile 2 at the top thereof.

Their width is equal to that of housings 14 so that they can engage therein. The top edge of each of said arms 13 (which is for instance at 45° to the vertical) is provided with a semi-circular notch 13a adapted to accommodate locking pin 12. The dimensions of each arm 13 and the location of the corresponding pin 12 in its housing are chosen such that when said arm is engaged in said housing and the pin is positioned so that the solid portion 12a thereof fills the notch 13a, the rear vertical edge of said arm 13 is in contact against the rear surface of housing 14. Arm 13 is then wedged in the housing 14 of wing 1, and any thrust exerted by the missile engine is applied to the aircraft.

Each pin 12 carries a lever 15 by means of which it can be rotated. Rotation of said lever 15 through 90° in the clockwise direction releases arm 13 which can then slide downwardly from casing 14.

Each wing 1 of the aircraft contains a fuel tank T connected through pipes P to the engine E of the aircraft. Each missile 2 is provided with a fuel tank T' which is automatically placed in communication with tank T when the missile is secured to the under side of the wing by means of the above described device.

Figure 17:
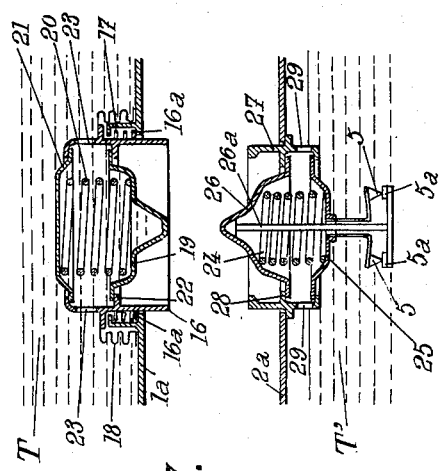
Figs. 17 and 18 are vertical sectional views of the valve system for connecting the aircraft tank with the missile tank, Fig. 17 showing the parts before assembly and Fig. 18 after assembly.

For this purpose, as shown by Fig. 17, an annular conduit 16 extends across the under wall 1a of tank T. This tubular member 16 is sidable in a corresponding aperture provided in said wall 1a and it is provided with a flange 16a applied against the edge of said aperture by a spring 17. Furthermore, bellows 18 interposed between tubular member 16 and the wall 1a of tank T prevent any leakage of fuel.

A valve member 19 is slidable inside tubular member 16 and it is applied against an annular valve seat 22 formed integral with said member 16 along the inner wall thereof by a spring 20 interposed between said valve member 19 and a plate 21 carried by the top end of tubular member 16. Openings 23 are provided in the upper portion of tubular member 16.

The top wall 2a of the tank T' of the missile 2 is provided with a tubular member 27 fixed along the edge of an aperture formed in said wall. Tubular member 27 is of the same diameter as tubular member 16 and is located in line therewith when the missile is fixed to the wing. The lower edge of member 16 is adapted to cooperate in this position with the upper edge of member 27 so as to form therewith a liquid-tight joint.

Slidable in tubular member 27 there is a valve member 26 adapted to cooperate with an annular valve seat 28 against which it is applied by a spring 24 bearing against a plate 25 carried by the lower end of tubular member 27. The central portion of valve member 26 projects above the horizontal plane of the top edge of tubular member 27 when said valve member 26 is applied against its valve seat 28.

Openings 29 are provided in the wall of tubular member 27 at the lower part thereof.

Figure 18:
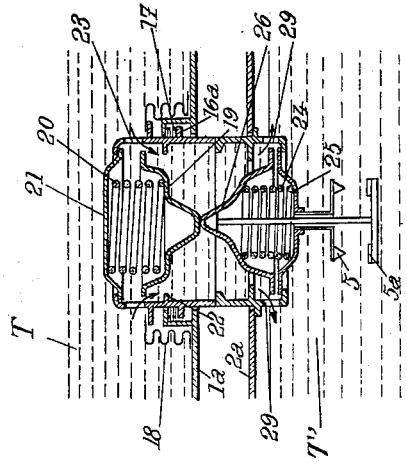

Fig. 18 shows that when the missile is secured to the wing, the top edge of member 27 comes to fit against the under edge of member 16. The center of valve member 26 and the center of valve member 19 come into contact and are thus caused to move away from their valve respective seats 28 and 22. Thus fuel can flow through orifices 23 from tank T into the conduit constituted by members 16 and 27 and thence through openings 29 into the missile fuel tank T'.

Two contacts 5 carried by plate 25 and insulated from each other, cooperate with contacts 5a, electrically connected with each other and carried by a rod 26a controlled by valve member 26 so that these contacts 5a close an electric circuit in which they are inserted in series in the position of Fig. 17, whereas they open this circuit in the position of Fig. 18.

Thus, as long as the missile 2 is carried by the aircraft, its tank T' is fed with fuel from the tank T of said aircraft. As soon as the missile is detached from the aircraft the communication is cut off and both of the tanks are shut up.

Figure 14:
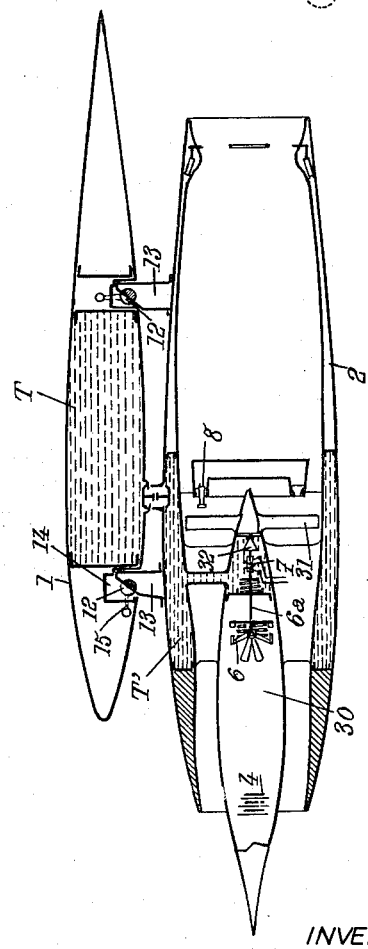
Fig. 14 is a vertical sectional view of such an aircraft in a plane passing through the axis of one missile.
Figure 19:
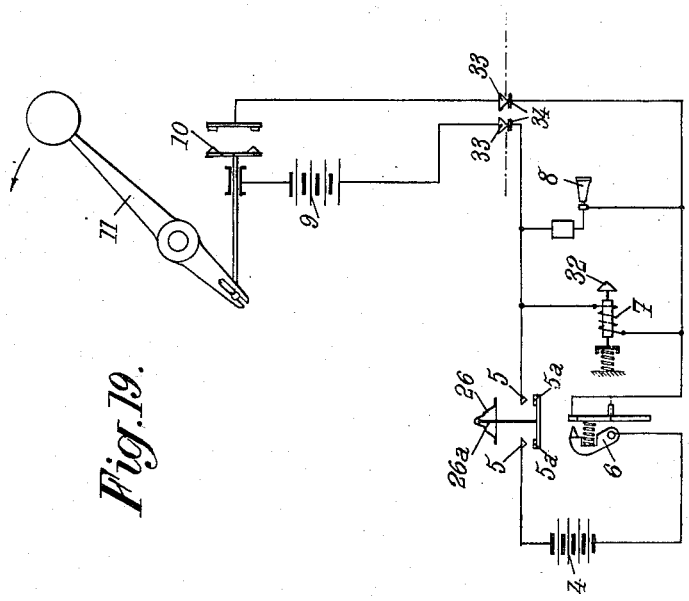
Fig. 19 is a lay-out of the electric system of the missile in the construction of Figs. 15 to 18.

Fig. 14 shows in vertical section a missile secured to the wing 1 of the aircraft. This missile is constituted by an annular structure 2, acting as aerodynamic lift producing surface, in which there is provided a ram-jet engine the casing of which is also constituted by the inner wall of said structure 2 acting as a wing.

Inside annular wing 2, there is provided a streamlined body 30 the rear end of which carries, rotatable about the axis of wing 2, a freely rotatable fuel distributing windmill 31. This windmill has hollow blades and is provided with outlet holes through which the fuel is projected into the space limited by the inner wall of wing 2. The communication between tank T' and the inside of said windmill 31 is controlled by a valve 32 normally closed by a spring and which may be opened by an electromagnet 7. The fuel injected into this ram-jet engine is ignited by means of at least one spark plug 8. The electric circuit for operating said electro-magnet 7 and spark plug 8 is shown on Fig. 19. As it will be seen, this circuit includes a battery 4 mounted in the streamlined body 30, electro-magnet 7 and spark plug 8 being inserted in shunt in said circuit. This circuit further includes a switch constituted by contacts 5 and 5a, as above referred to, and a centrifugal switch 6 mounted on a shaft 6a driven by windmill 31 and which is normally open and is closed when the speed of the missile is above a given value. This electric circuit is connected through contacts 33—34 with an electric circuit carried by the aircraft when the missile is secured to the aircraft. These contacts 33—34 open as soon as the missile is detached from the aircraft. The above mentioned electric circuit carried by the aircraft includes a battery 9 and a switch 10 controlled by a lever 11 to be operated by the pilot of the aircraft.

Before the missile is fixed to the aircraft, switch 5—5a is closed but switch 6 is open, therefore the electric circuit of the missile is open.

When the missile is fixed to the aircraft, switch 5—5a is opened and contacts 33—34 are closed.

When the aircraft is flying at a sufficient speed switch 6 is closed. But, since switch 5—5a is open, battery 4 cannot supply current to electro-magnet 7 and spark plug 8. But due to the closing of contacts 33—34 electromagnet 7 and spark plug 8 can be supplied with current from battery 9, carried by the aircraft. It suffices, to obtain this result, for the pilot to rotate lever 11 in the direction of the arrow. Therefore the pilot can at will, by operating lever 11, either start the engine of the missile to obtain supplementary power or switch it off.

When the missile is to be launched, locking pins 12 are rotated, thus releasing the missile. The valve members 19 and 26 are automatically applied by springs 20 and 24 against their respective valve seats 28 and 22, so that no fuel can flow out from tanks T and T'. This automatically closes switch 5—5a just at the time contacts 33 and 34 are moved away one from another. Therefore the electric circuit of the missile engine is then closed on battery 4 just as it is cut off from battery 9. The missile can therefore operate by itself.

My combination has the following advantages:

A much wider choice of the characteristics of the missiles to be carried by the aircraft can be made because these missiles, instead of impairing the qualities of said aircraft, on the contrary supply a supplementary thrust thereto;

When the missiles are provided with ram-jet engines, they work during transportation flight in the best possible conditions since they are flying at a speed much higher than that they would have if they were propelled by their own thrust and it is known that the consumption of a ram-jet engine in such conditions is of the same order of magnitude as that of a turbo-jet engine provided with an after-burner, whereas for lower speeds of flight the consumption of a ram-jet engine is much greater than that of a turbo-jet provided with an after-burner;

When the missiles are launched, they have an initial velocity higher than if they did not participate in propulsion of the carrier aircraft.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. The combination of an aircraft having fuel supply means and propelling means including at least one turbo-engine supplied with fuel from such fuel supply means, at least one self-propelled missile carried by said aircraft and detachable therefrom for launching toward a target, means to transmit forward thrust from said missile to said aircraft when said missile is attached thereto, said missile having propelling means constituted by a ram-jet engine and a fuel tank for said last mentioned engine, said ram-jet engine having an annular casing, said missile having its lift producing structure constituted by said annular casing and means for separably connecting said fuel supply means with said second mentioned engine, whereby as long as said missile is being carried by said aircraft the missile propelling means can be used to cooperate in the aircraft propulsion without consuming fuel from the tank carried by said missile.

2. A combination according to claim 1 in which said aircraft has a conventional wing, said missile being carried by said wing.

3. A combination according to claim 1 in which said aircraft has a fuselage, said missile being carried by said fuselage.

4. A combination according to claim 1 in which said aircraft has a tunnel-shaped annular wing, said missile being mounted inside said wing.

5. A combination according to claim 1 in which said aircraft has a tunnel-shaped annular wing, said missile being mounted on the outside of said wing.

References Cited in the file of this patent

UNITED STATES PATENTS

| | | |
|---|---|---|
| 1,650,346 | Hall | Nov. 22, 1927 |
| 2,666,656 | Bruning | Jan. 19, 1954 |

FOREIGN PATENTS

| | | |
|---|---|---|
| 439,805 | Great Britain | Dec. 6, 1935 |
| 1,050,948 | France | Sept. 9, 1953 |
| 1,075,613 | France | Apr. 14, 1954 |
| 1,109,659 | France | Sept. 28, 1955 |